United States Patent
St Louis (12)

(10) Patent No.: US 6,367,536 B1
(45) Date of Patent: Apr. 9, 2002

(54) VEHICLE WINDOW SCREEN

(76) Inventor: Shirley St Louis, P.O. Box 235, Byfield, MA (US) 01922

( * ) Notice: Subject to any disclaimer, the term of this patent is extended or adjusted under 35 U.S.C. 154(b) by 0 days.

(21) Appl. No.: 09/665,601

(22) Filed: Sep. 20, 2000

(51) Int. Cl.[7] .................................................. E06B 9/00
(52) U.S. Cl. ......................... 160/90; 160/90; 160/352; 160/370.21; 160/354; 296/152
(58) Field of Search ......................... 160/368.1, 370.21, 160/90, 354, 352, 371, 368.2, 390; 296/97.7, 97.8, 97.9, 138, 152

(56) References Cited

U.S. PATENT DOCUMENTS

| | | | |
|---|---|---|---|
| 2,665,754 A | * | 1/1954 | Claussen et al. |
| 2,717,036 A | * | 9/1955 | Harris |
| 2,937,700 A | * | 5/1960 | Gibbons |
| 3,085,621 A | * | 4/1963 | Meranto |
| 3,749,147 A | * | 7/1973 | Hess et al. |
| 3,960,195 A | | 6/1976 | Marchbanks |
| 4,139,233 A | | 2/1979 | Bott |
| 5,524,694 A | | 6/1996 | Arapis |
| 5,713,624 A | | 2/1998 | Tower |
| 6,015,180 A | * | 1/2000 | Beuerle |

* cited by examiner

Primary Examiner—Blair M. Johnson
(74) Attorney, Agent, or Firm—Joseph R. Birkner

(57) ABSTRACT

A vehicle window screen for a window opening of a vehicle in the form of a curtain having a shape generally conforming to the window opening of the vehicle is disclosed. The curtain having an upper portion, a central portion and a lower portion with elastomeric members disposed thereon the portions. The upper portion removably attachable on a top portion of a door of the vehicle above the window opening of the vehicle, the central portion removably attachable on a side edge of the door of the vehicle and the lower portion removably attachable on the door of the vehicle below the window opening of the vehicle and a means for removably fastening the lower portion of the curtain to the side edge of the door of the vehicle including a clip and a mechanical stop member.

3 Claims, 3 Drawing Sheets

VEHICLE WINDOW SCREEN

FIELD OF THE INVENTION

This invention relates generally to a vehicle window screen. More particularly, the present invention relates to a vehicle window screen for a top window above a door of a vehicle.

BACKGROUND OF THE INVENTION

Screens for installation into the window opening of a vehicle such as an automobile, truck or van are used to provide ventilation while preventing insects from entering the passenger compartment of the vehicle. Screens are available in the form of fixed or slideable members for such applications while some are portable. Permanently installing a screen on a window located at the top of a vehicle door is impractical since the screen interferes with the operation of the window. Attempts by earlier inventors to provide a portable screen which is readily available when needed and one which is transportable for use with various vehicles and is easily stored in the vehicle without taking up a large amount of cargo space have generally resulted in failure to deliver such a needed device.

U.S. Pat. No. 5,524,694 to Arapis, shows a protective screen for a vehicle window with elastic straps which loop around the bottom of the door and a plastic sheet therebetween. The plastic sheet protects the occupants from thrown debris such as bricks and block. Such a device would not be practical for providing ventilation therethrough due to its construction and intended use nor would the rigid structural plastic material readily allow the screen apparatus to be folded for storage without mechanical damage.

U.S. Pat. No. 4,139,233 to Bott discloses a screen for the window at the top of a vehicle door attached about the mirror and armrest similar, in some respects, to the previous mentioned design. This design also employs magnets for securing the screen to the vehicle door. A disadvantage of this design is that it is not readily usable, without a large modification, on another vehicle and is limited in portability.

U.S. Pat. No. 5,713,624 to Tower discloses a restraining net for a car window with mesh and attaching devices for use with a vehicle door that is also similar to the previous designs with similar disadvantages.

U.S. Pat. No. 3,960,195 to Marchbanks shows a ventilated screen for motor vehicle passenger compartment window openings. The design employs a zipper and is installed between the weather stripping and the vehicle window body structure. A disadvantage is that the design is difficult to install and can not be readily transported for use on another vehicle nor can it be readily stored in a compact manner when not needed.

None of the above prior art devices disclose a screen for a vehicle which is simple in design and is easy to use and is readily transportable and easily installed on the window openings of various vehicles with little modification.

In view of the above mentioned problems and limitations associated with conventional vehicle screens, it was recognized by the present inventor that there is an unfilled need for an improved screen for a vehicle which is simple in design, practical, compact, portable and highly functional.

Accordingly, it becomes clear that there is a great need for a vehicle window screen which overcomes the disadvantages of the prior art vehicle window screen devices. Such a screen should be one that is easy to use, is positively securable to the door of a vehicle and to the window opening without interfering with window operation and is economically manufactured.

SUMMARY OF THE INVENTION

It is therefore an object of this invention to provide a vehicle window screen in the form of a curtain having a shape generally conforming to a window opening of a vehicle. The curtain, being attachable to a door of the vehicle, for use as a window screen which avoids the aforementioned problems of prior art devices.

It is another object of this invention to provide a vehicle window screen that is readily adaptable to and one which fits a wide variety of vehicle window openings with little modification.

It is a further object of this invention to provide a vehicle window screen that may be selectively installed on a passenger side and on a driver side of the vehicle.

It is still a further object of this invention to provide a vehicle window screen which may be manufactured from readily available materials by conventional manufacturing processes.

It is a still a further object of this invention to provide a vehicle window screen that is simple in design, simple to manufacture, low in cost and easy to use.

This invention results from the realization that there is a great need for an improved vehicle window screen. The resulting invention provides a user the capability of conveniently being able to enjoy the cooling effect provided by an open window on a vehicle without the bothersome annoyance caused by insects which enter the window if not provided with the instant invention.

The above and the other objects are achieved in accordance with the present invention, which, according to a first aspect, provides a vehicle window screen for a window opening of a vehicle comprising a curtain having a shape generally conforming to the window opening of the vehicle. The curtain having an upper portion removably attachable on a top portion of a door of the vehicle above the window opening of the vehicle, a central portion removably attachable on a side edge of the door of the vehicle and a lower portion removably attachable on the door of the vehicle below the window opening of the vehicle and a means for removably fastening the lower portion of the curtain to the side edge of the door of the vehicle.

The second aspect is a special case of the first aspect of this invention with additional features.

According to a second aspect of the invention an upper portion of a curtain has a first elastomeric member disposed thereon. The central portion of the curtain has a second elastomeric member disposed thereon and the second elastomeric member extending between the upper portion and the lower portion of the curtain. The lower portion of the curtain having a hem with open ends extending horizontally along the lower portion of the curtain and a third elastomeric member freely disposed within the hem and the third elastomeric member cooperating with the hem so that the third elastomeric member may be stretched to fit across the door of the vehicle.

The third aspect is a special case of the first aspect and second aspects of this invention with additional features.

According to a third aspect of the invention, disclosed is a vehicle window screen having a means for removably fastening a lower portion of the curtain to a side edge of a door of a vehicle including a clip and a mechanical stop member. The clip is disposed on a first end of a third elastomeric member and on a second end of a third elastomeric member of a lower portion of a curtain for removably fastening the lower portion of the curtain to the side edge of the door of the vehicle. The mechanical stop member is disposed on the side edge of the door below a window opening of the vehicle to prevent the clip from sliding along the side edge of the door of the vehicle and thereby preventing the vehicle window screen from dislodging from the door of the vehicle.

According to a fourth aspect of the invention, disclosed is a method for making a vehicle window screen for a window opening of a vehicle.

BRIEF DESCRIPTION OF THE DRAWINGS

In the accompanying drawings:

FIG. 2A is an enlarged broken view of the vehicle window screen of FIG. 2 taken within the circle 2A thereof showing a second elastomeric member;

DETAILED DESCRIPTION OF PREFERRED EMBODIMENTS

Looking more particularly to the drawings, there is shown in FIGS. 1–6 a preferred embodiment of a vehicle window screen for a window opening of a vehicle which is generally indicated at 10, according to a preferred embodiment of the present invention.

Figure 1:
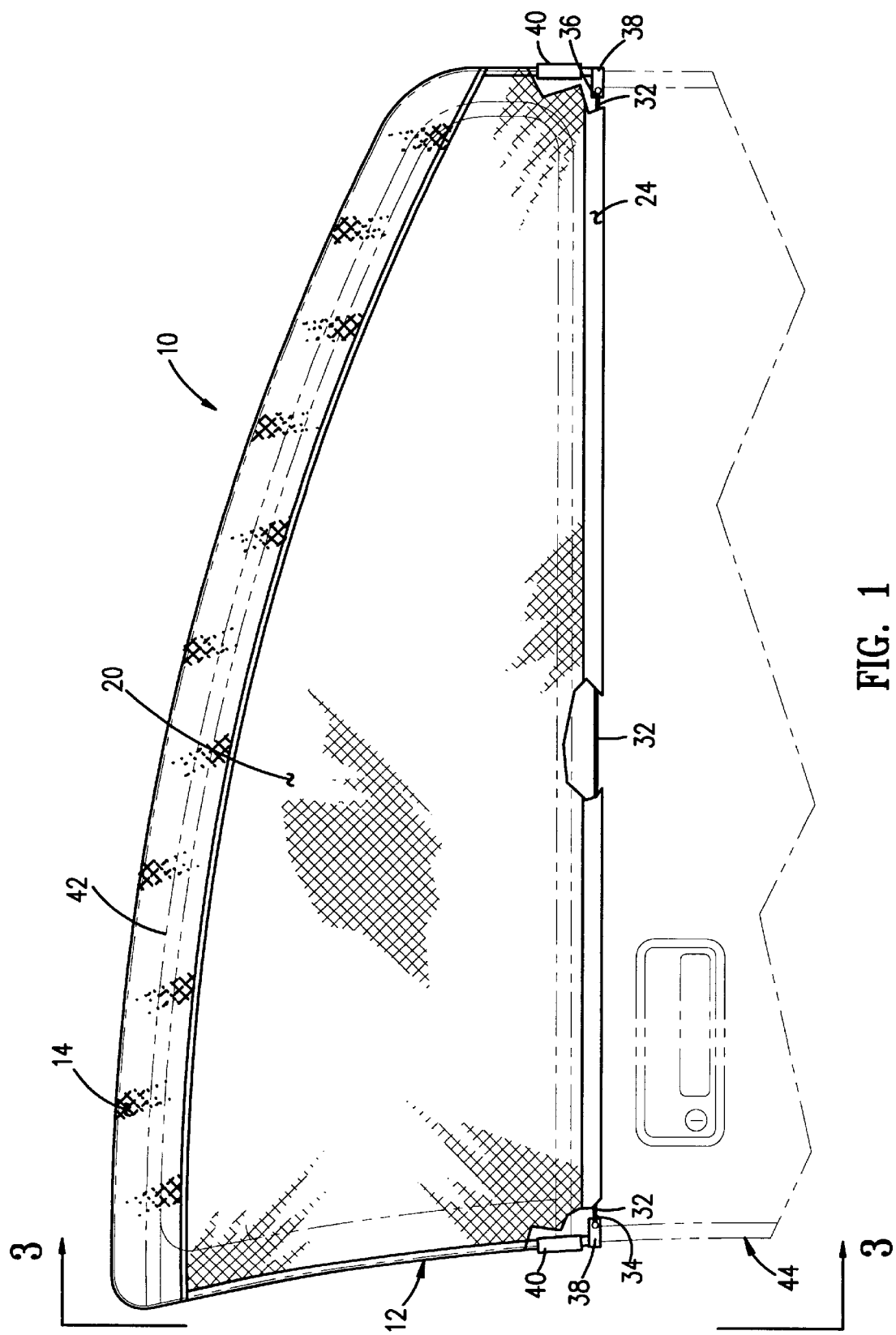
FIG. 1 is a front elevation view of a preferred embodiment of a vehicle window screen of the instant invention shown mounted on a top window above a door of a vehicle on an exterior of the vehicle on a passenger side with the door shown in phantom.

FIG. 1 is a front elevation view of a preferred embodiment of the vehicle window screen 10 of the instant invention shown mounted on a top window above a door 44 of a vehicle on the exterior of the vehicle on a passenger side with the door 44 shown in phantom. It is understood that the vehicle window screen 10 may also be mounted on a driver side of the vehicle.

Figure 4:
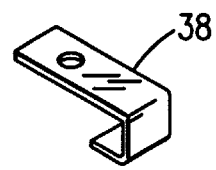
FIG. 4 is a perspective view of a preferred embodiment of the instant invention showing a clip.
Figure 5:
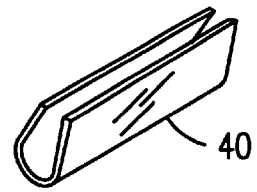
FIG. 5 is a perspective view of a preferred embodiment of the instant invention showing a mechanical stop member and, FIG. 6 is an enlarged perspective view showing the details of the instant invention including a lower portion of the vehicle window screen, the hem, the clip, the mechanical stop member and the third elastomeric member with a side edge of the door shown in phantom.

As seen in FIG. 1, the vehicle window screen 10 has a curtain 12 with a shape generally conforming to a window opening 48 of a vehicle. The curtain 12 has an upper portion 14 removably attachable on a top portion 42 of a door 44 of the vehicle above the window opening 48, a central portion 20 removably attachable on a side edge 46 of the door 44 and a lower portion 24 removably attachable on the door 44 below the window opening 48 of the vehicle and a means for removably fastening the lower portion 24 of the curtain 12 to the side edge 46. The fastening means includes a clip 38 as best seen in FIG. 4. The clip 38 is disposed on a first end 34 and on a second end 36 of a third elastomeric member 32 of the lower portion 24 of the curtain 12 for removably fastening the lower portion 24 to the side edge 46 of the door 44. Although not necessary for operation, the fastening means may further include a mechanical stop member 40 as best seen in FIG. 5. The mechanical stop member 40 is disposed on the side edge 46 of the door 46 below the window opening 48 of the vehicle to prevent the clip 38 from sliding along the side edge 46 and thereby preventing the vehicle window screen 10 from dislodging from the door 44 of the vehicle.

Figure 3:
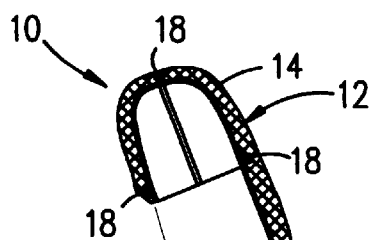
FIG. 3 is a cross sectional view of a preferred embodiment of a vehicle window screen of the instant invention taken along the line 3—3 of FIG. 1 with the door shown in phantom.

The upper portion 14 of the curtain 12 has a first elastomeric member 18 disposed thereon as best seen in FIG. 3.

Figure 2:
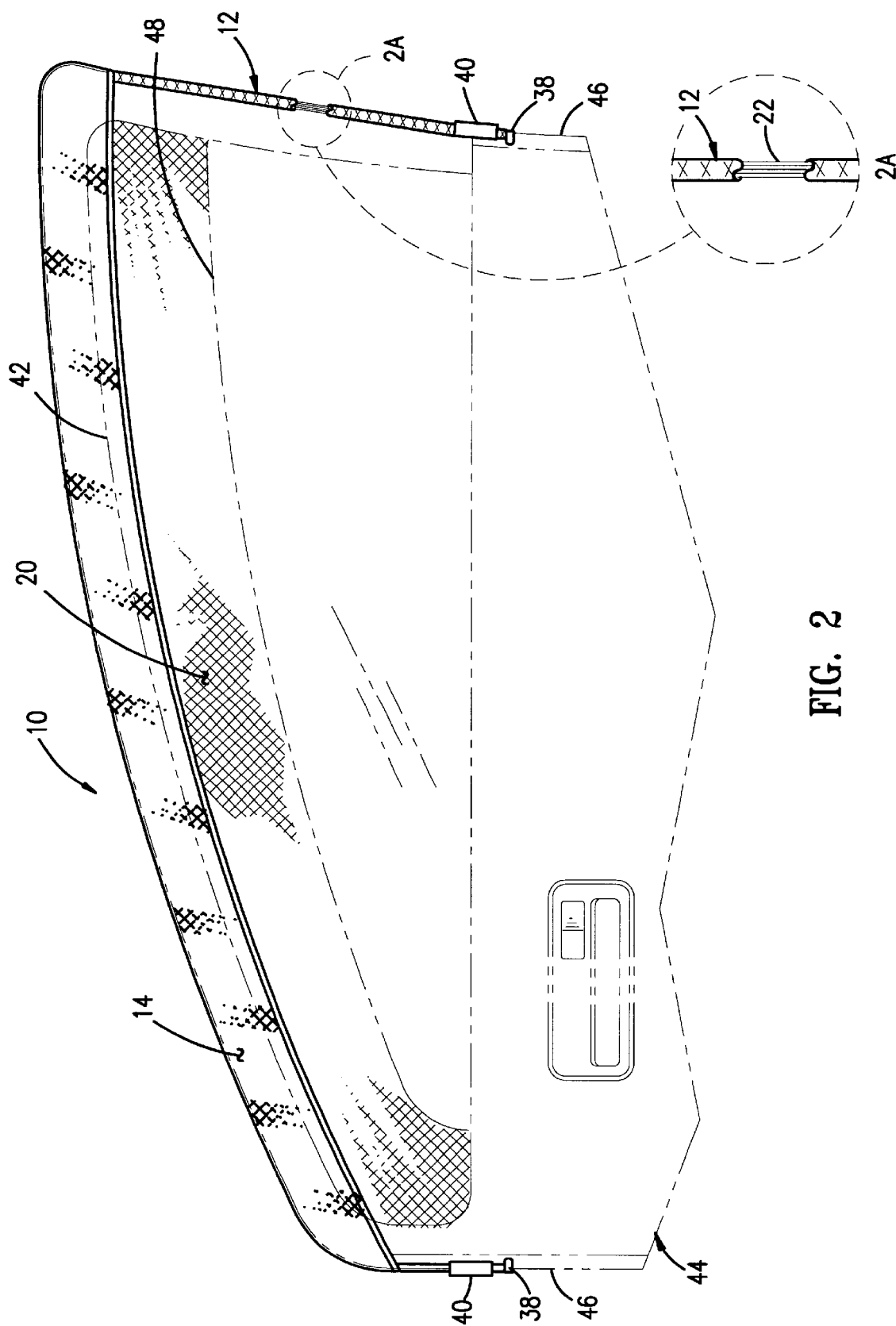
FIG. 2 is a rear elevation view of a preferred embodiment of a vehicle window screen of the instant invention of FIG. 1 shown mounted on an interior door of the vehicle with the door shown in phantom.

FIG. 2 is a rear elevation view of a preferred embodiment of the vehicle window screen 10 of the instant invention of FIG. 1 shown mounted on the interior door of the vehicle with the door 44 shown in phantom.

FIG. 2A is an enlarged broken view of the vehicle window screen 10 of FIG. 2 taken within the circle 2A thereof showing a second elastomeric member 22.

Figure 3A:
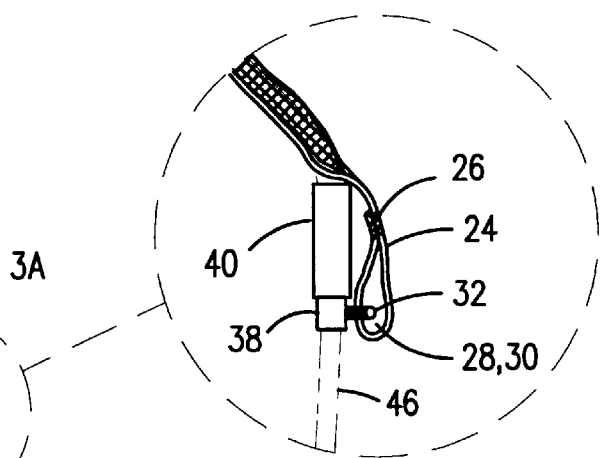
FIG. 3A is an enlarged broken view of the vehicle window screen of FIG. 3 taken within the circle 3A thereof showing a hem with a first and a second opening and a third elastomeric member disposed therethrough the openings in the hem.

FIG. 3A is an enlarged broken view of the vehicle window screen of FIG. 3 taken within the circle 3A thereof showing a hem 26 with a first open end 28 and a second open end 30 through which the third elastomeric member 32 freely passes.

As shown in FIG. 2 and in FIG. 2A, although not needed for operation, preferably for a more snug fit, the central portion 20 of the curtain 12 has the second elastomeric member 22 disposed thereon and extending between the upper portion 14 and the lower portion 24 of the curtain 12. The second elastomeric member 22 being attachable to the side edge 46 of the door 44 of the vehicle.

The lower portion 24 has the hem 26, extending horizontally along the lower portion 24 of the curtain 12. The hem 26, as shown in FIGS. 3, 3A and 6 has the first open end 28 and the second open end 30 and the third elastomeric member 32 being freely disposed within the hem 26 and cooperating with the hem 26 so that the third elastomeric member 32 may be stretched to fit across the door 44 of the vehicle and be removably fastened to the side edge 46 of the door 44 of the vehicle with the clip 38 and with the mechanical stop member 40 when the mechanical stop member 40 is provided.

Figure 6:
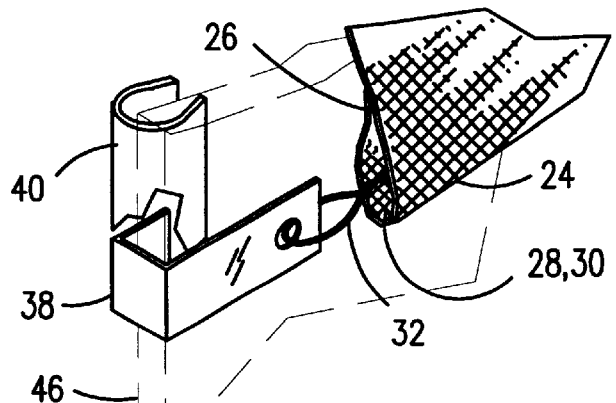

FIG. 6 is an enlarged perspective view showing the details of the instant invention including the lower portion 24 of the vehicle window screen 10, the hem 26, the clip 38, the mechanical stop member 40 and the third elastomeric member 32 with the side edge 46 of the door 44 shown in phantom.

The vehicle window screen 10 may be fabricated from readily available fabric and elastomeric materials by conventional fabrication techniques. For example, the curtain 12 may be made from a mesh fabric material chosen from the group consisting of nylon, rayon and vinyl. The curtain 12 may be fabricated by joining the upper portion 14 to the central portion 20 and to the lower portion 24 by sewing.

The clip 38 and the mechanical stop member 40 may each be fabricated from a material chosen from the group consisting of plastic and rubber. The clip 38 may be configured in one of a hook shape, a "J" shape and an "S" shape. The mechanical stop 40 member may preferably be configured as a small tube of about 1 to 2 inches (2.5 to 5.2 cm) in length having a longitudinal slit on a surface of the small tube to allow the mechanical stop member 40 to slip over the side edge 46 of the door 44 of the vehicle and be retained thereon by friction. The clip 38 and the mechanical stop member 40 are each dimensioned to allow the door 44 to be normally closed, without interference and without marring or damaging a finished surface of the vehicle, when the vehicle window screen 10 is installed on the vehicle.

To use the vehicle window screen 10, a user simply places the upper portion 14 of the curtain on a top portion 42 of the door 44 of either a passenger side or on a driver side of the vehicle above the window opening of the vehicle by stretching the first elastomeric member 18 of the upper portion 14 and positioning it on the top portion 42 of the door 44. The second elastomeric member 22 of the central portion 20 is similarly stretched and is attached on a side edge 46 of the door 44 of the vehicle. The lower portion 24 is placed on the door 44 of the vehicle below the window opening of the vehicle. The third elastomeric member 32 on the lower portion 24 of the curtain 12 is stretched so that the third elastomeric member 32 extends and fits across the door 44. Using the clip 38, the lower portion 24 of the curtain 12 is removably attached to the side edge 46 of the door 44 of the vehicle. Although not entirely necessary for operation, the invention may work better if the mechanical stop member 40 is placed on the side edge 46 of the door 44 so that the clip 38, when placed at a location below the mechanical stop member 40, will be retained. The mechanical stop member 40 may find use when the window opening of the vehicle is sharply angled and is more susceptible to possible slippage when the clip 38 is placed thereon; however for most vehicle applications, the mechanical stop member 40 is not needed.

Surprisingly, the instant invention provides an added advantage and recognizes a problem and adequately and completely addresses an unfilled need, in that a vehicle window screen 10, in the manner disclosed, in effect, provides a convenient device which is portable, is readily and selectively installed on either side of the vehicle on a wide range of window openings of various vehicles and provides the desired above mentioned advantages and benefits to a user. Since the instant invention is made from a fabric material it may be folded and rolled into a compact size for storage and may also be laundered.

Although sized to fit a wide variety of vehicles, the vehicle window screen 10 may be constructed in a wide variety of sizes and style variations to fit the widow openings of various vehicles such as automobiles, recreational vehicles, vans and trucks. One practical advantage of the invention is that it provides a convenient, practical, low cost, vehicle window screen 10 which allows a user to conveniently have ventilation and protection from insects when camping or when having the window open when parked such as when eating without the need to have the window open without the invention installed. The invention may also be used when the vehicle is in motion without impairing the visibility through the open window and the window may be closed with the vehicle window screen installed. A further advantage of the invention is that the vehicle window screen 10 is designed for ease of manufacture by standard methods and by using readily available materials.

Of course, a wide variety of further uses and advantages of the present invention will become apparent to one skilled in the art.

As disclosed, it is apparent that the instant invention can provide other covering, fastening and decorative options. One skilled in the art will realize that the foregoing discussion outlines the more important features of the invention to enable a better understanding of the instant invention and to instill a better appreciation of the inventor's contribution to the art. It must be clear that the disclosed details of construction, descriptions of geometry and illustrations of inventive concepts are mere examples of possible manifestations of the invention.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A vehicle window screen for a window opening of a vehicle comprising:

a curtain, fabricated from a mesh fabric material chosen from the group consisting of nylon, rayon and vinyl, said curtain having a shape generally conforming to the window opening of the vehicle;

said curtain having an upper portion removably attachable on a top portion of a door of the vehicle above the window opening of the vehicle, a central portion removably attachable on a side edge of the door of the vehicle and a lower portion removably attachable on the door of the vehicle below the window opening of the vehicle;

said upper portion of said curtain having a first elastomeric member disposed thereon;

said central portion of said curtain having a second elastomeric member disposed thereon and said second elastomeric member extending between said upper portion and said lower portion of said curtain;

said lower portion of said curtain having a hem, extending horizontally along said lower portion of said curtain, said hem having a first open end and a second open end; and a third elastomeric member freely disposed within said hem and said third elastomeric member cooperating with said hem so that said third elastomeric member may be stretched to fit across the door of the vehicle;

a clip disposed on a first end of said third elastomeric member and on a second end of said third elastomeric member of said lower portion of said curtain for removably fastening said lower portion of said curtain to the side edge of the door of the vehicle; and a mechanical stop member disposed on the side edge of the door below the window opening of the vehicle to prevent said clip from sliding along the side edge of the door of the vehicle and thereby preventing said vehicle window screen from dislodging from the door of the vehicle.

2. The vehicle window screen of claim 1 wherein said clip and said mechanical stop member are each dimensioned to allow the door of the vehicle to be normally closed, without interference and without marring or damaging a finished surface of the vehicle, when said vehicle window screen is installed on the vehicle.

3. The vehicle window screen of claim 2 wherein said clip and said mechanical stop member are each fabricated from a material chosen from the group consisting of plastic and rubber.

\* \* \* \* \*